(12) United States Patent
Hamada et al.

(10) Patent No.: US 7,457,536 B2
(45) Date of Patent: Nov. 25, 2008

(54) FLASH DEVICE

(75) Inventors: Takashi Hamada, Hachioji (JP);
Takanaru Kobayashi, Kadoma (JP);
Akira Iwamoto, Osaka (JP); Satsuki Ishibashi, Ina (JP)

(73) Assignees: Olympus Corporation, Tokyo (JP);
Matsushita Electric Industrial Co. Ltd., Osaka (JP)

( * ) Notice: Subject to any disclaimer, the term of this patent is extended or adjusted under 35 U.S.C. 154(b) by 813 days.

(21) Appl. No.: 10/999,814

(22) Filed: Nov. 30, 2004

(65) Prior Publication Data

US 2005/0135078 A1 Jun. 23, 2005

(30) Foreign Application Priority Data

Dec. 5, 2003 (JP) ............................. 2003-407784

(51) Int. Cl.
*G03B 15/03* (2006.01)
*G03B 15/02* (2006.01)
*H04N 5/222* (2006.01)

(52) U.S. Cl. ........................... 396/182; 348/371; 362/11

(58) Field of Classification Search .................... 396/3, 396/6, 52, 61, 182, 203, 205, 279, 422; 362/11; 348/370, 371, 294; 347/86; 315/185 R, 315/185 S See application file for complete search history.

(56) References Cited

U.S. PATENT DOCUMENTS 4,192,590 A * 3/1980 Kitaura ....................... 396/203

FOREIGN PATENT DOCUMENTS

JP 2002-229106 8/2002

* cited by examiner

*Primary Examiner*—Melissa Jan Koval
(74) *Attorney, Agent, or Firm*—Straub & Pokotylo; John C. Pokotylo

(57) ABSTRACT

A flash device includes at least one light emitting unit is attachable to a plurality of connection portions. A shielding portion shields the connection portion without an attached light emitting unit. A capacitor accumulates an electric charges and is charged by a charging circuit. A control circuit includes judges both (1) whether or not all the plurality of connection portions are shielded and (2) whether or not the light emitting unit is attached to at least one of the plurality of connection portions, and permits the capacitor to be charged if both all the connection portions are shielded and the light emitting unit is attached to at least one of the plurality of connection portions.

15 Claims, 5 Drawing Sheets

| | | Poweroff state in uncharged state | | | |
|---|---|---|---|---|---|
| Conditions | Light emitting unit | Not attached | Not attached | One or more light emitting units attached | One or more light emitting units attached |
| | Cap | No cap | All caps | No cap on connection portion to which any light emitting unit is not attached | Caps on remaining connection portions |
| Control operation of controller | | Power supply does not turn on | Power supply does not turn on | Power supply does not turn on | Power supply turns on in response to user's operation |

FIG. 5A

| | | Poweron state | | | |
|---|---|---|---|---|---|
| Conditions | Light emitting unit | | Not attached | One or more light emitting units attached | One or more light emitting units attached |
| | Cap | | Caps on remaining connection portions | No cap | Caps on remaining connection portions |
| Control operation of controller | | | Power supply turns off after forcible discharging | Power supply turns off after forcible discharging | Power supply turns off in response to user's operation |

FIG. 5B

| | | Poweroff state in charged state | | | |
|---|---|---|---|---|---|
| Conditions | Light emitting unit | | Not attached | One or more light emitting units attached | One or more light emitting units attached |
| | Cap | | Caps on remaining connection portions | No cap | Caps on remaining connection portions |
| Control operation of controller | | | Forcible discharging | Forcible discharging | Power supply turns on in response to user's operation |

FIG. 5C

FLASH DEVICE

CROSS-REFERENCE TO RELATED APPLICATIONS

This application is based upon and claims the benefit of priority from prior Japanese Patent Application No. 2003-407784, filed Dec. 5, 2003, the entire contents of which are incorporated herein by reference.

BACKGROUND OF THE INVENTION

1. Field of the Invention

The present invention relates to a flash device, particularly to a flash device having a plurality of connection portions to which a plurality of light emitting units are attachable.

2. Description of the Related Art

Among flash devices attached to cameras for use, there has been a flash device in which a control unit and a light emitting unit are attachable as separate units as proposed in Jpn. Pat. Appln. KOKAI Publication No. 2002-229106. In the flash device proposed in this Jpn. Pat. Appln. KOKAI Publication No. 2002-229106, the control unit including a flash charging circuit, a light emitting control circuit and the like is attached to a camera main body, further the light emitting unit for the flash is attached to a tip of a photographing lens of the camera, the control unit is connected to the light emitting unit via a cable, and accordingly the device is used. This type of flash device is used mainly at the time of macrophotography in many cases, and the light emitting unit is changed in accordance with a subject, or a plurality of light emitting units may be attached.

BRIEF SUMMARY OF THE INVENTION

According to a first aspect of the present invention, there is provided a flash device comprising: at least one light emitting unit; a plurality of connection portions constituted so that at least one light emitting unit is attachable thereto; a plurality of shielding portions to shield the connection portion to each of which the light emitting unit is not attached; a capacitor which accumulates electric charges to allow the light emitting unit to emit light; a charging circuit which charges the capacitor; and a control circuit including a first judgment section to judge whether or not all the plurality of connection portions are shielded and a second judgment section to judge whether or not the light emitting unit is attached to at least one of the plurality of connection portions, the control circuit permitting electric charges accumulation operation into the capacitor by the charging circuit in a case where the first judgment section judges that all the connection portions are shielded and the second judgment section judges that the light emitting unit is attached to at least one of the plurality of connection portions.

According to a second aspect of the present invention, there is provided a flash device comprising: a plurality of light emitting units; a plurality of connection portions constituted so that the plurality of light emitting units are attachable thereto; a plurality of caps to shield connection portions to which the light emitting units are not attached; a capacitor which accumulates an electric charges to allow the light emitting unit to emit light; a charging circuit which charges the capacitor; a plurality of detection members which are disposed in the plurality of connection portions and which are displaced in cooperation with attachment of the light emitting unit or the cap; a plurality of detection switches which are disposed in the plurality of detection members and whose states change in accordance with the displacements of the detection members; detection terminals which are disposed in the plurality of connection portions and whose potential levels change in accordance with attached states of the light emitting units; and a control circuit which controls the charging by the charging circuit and an operative state of the flash device based on the states of the detection switches and the potential levels of the detection terminals.

According to a third aspect of the present invention, there is provided a flash device comprising: a plurality of light emitting units; a plurality of connection portions constituted so that the plurality of light emitting units are attachable thereto; a capacitor which accumulates an electric charges to allow the light emitting unit to emit light; a charging circuit which charges the capacitor; and a control circuit which controls the charging circuit in such a manner as to prohibit the charging of the capacitor in a case where at least one of the plurality of connection portions is opened.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 5A to 5C are diagrams showing a control operation of the controller section in accordance with a state of each connection portion.

DETAILED DESCRIPTION OF THE INVENTION

An embodiment of the present invention will be described comparatively with reference to the drawings.

Figure 1:
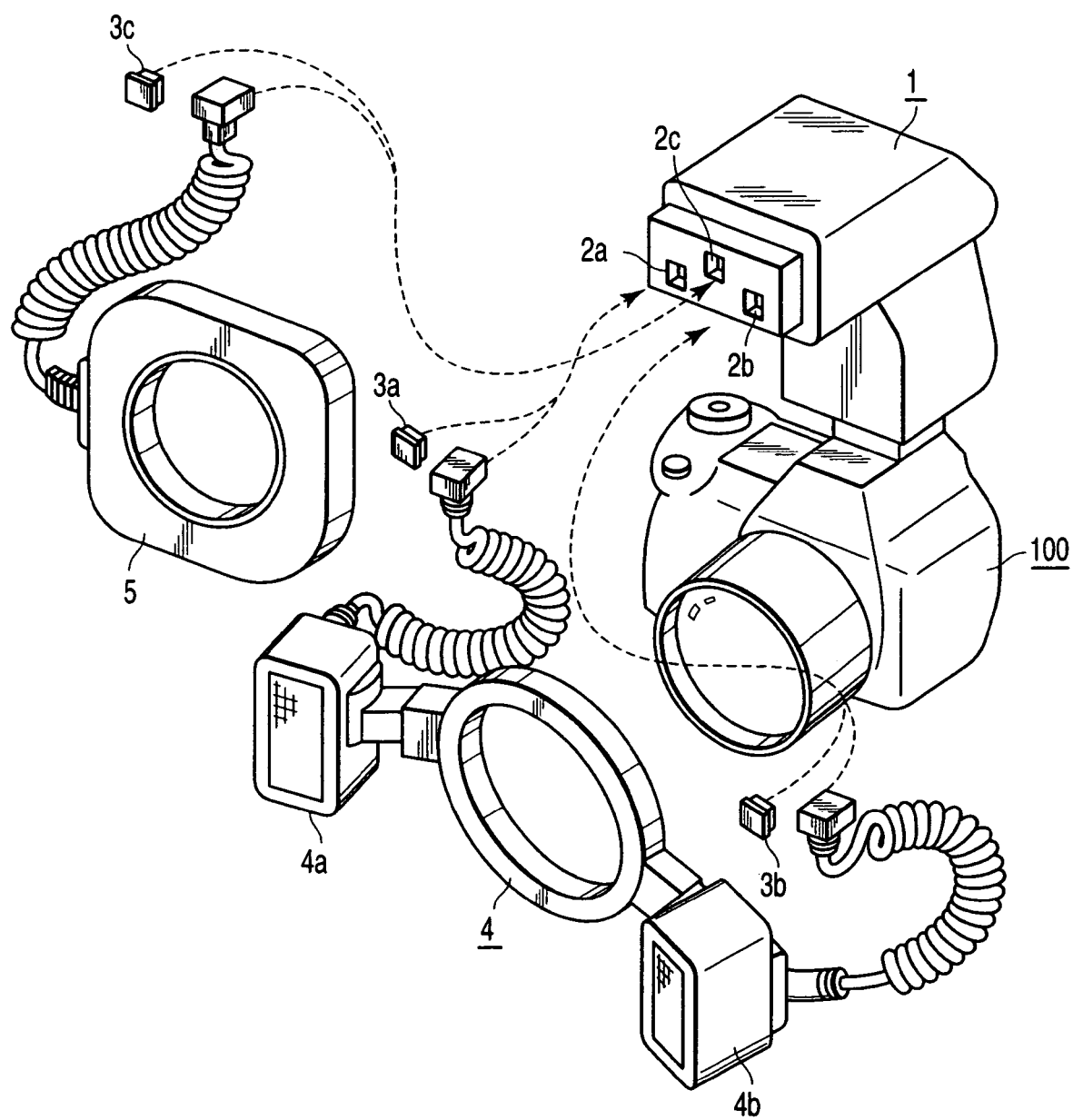
FIG. 1 is an appearance perspective view of a flash device according to one embodiment of the present invention, and a camera to which the flash device is detachably attachable.

FIG. 1 is an appearance perspective view of a flash device according to one embodiment of the present invention, and a camera 100 to which the flash device is detachably attachable. It is to be noted that the camera 100 is not especially limited as long as the camera has a mechanism (e.g., a hot shoe mechanism, etc.) for attaching an external flash device, and an internal constitution which has heretofore been well known may be used. Therefore, the only flash device will be described hereinafter.

That is, the flash device according to one embodiment of the present invention comprises a macro twin flash light emitting unit 4 or a ring flash light emitting unit 5 (hereinafter referred to as the light emitting unit 5) attached to connection portions 2a to 2c of a control unit 1 including a charging circuit, a light emitting control circuit and the like for flash. Here, the macro twin flash light emitting unit 4 is provided with two light emitting units (light emitting units 4a, 4b).

They may be attached to the control unit 1 at the same time, or only one of them may be attached.

Moreover, when there is an unused connection portion among the connection portions 2a to 2c of the control unit 1, caps 3a to 3c are attached as shielding members to the unused connection portions to shield the portions. It is to be noted that the caps 3a to 3c preferably comprise insulating materials (e.g., resin, etc.).

Figure 2:
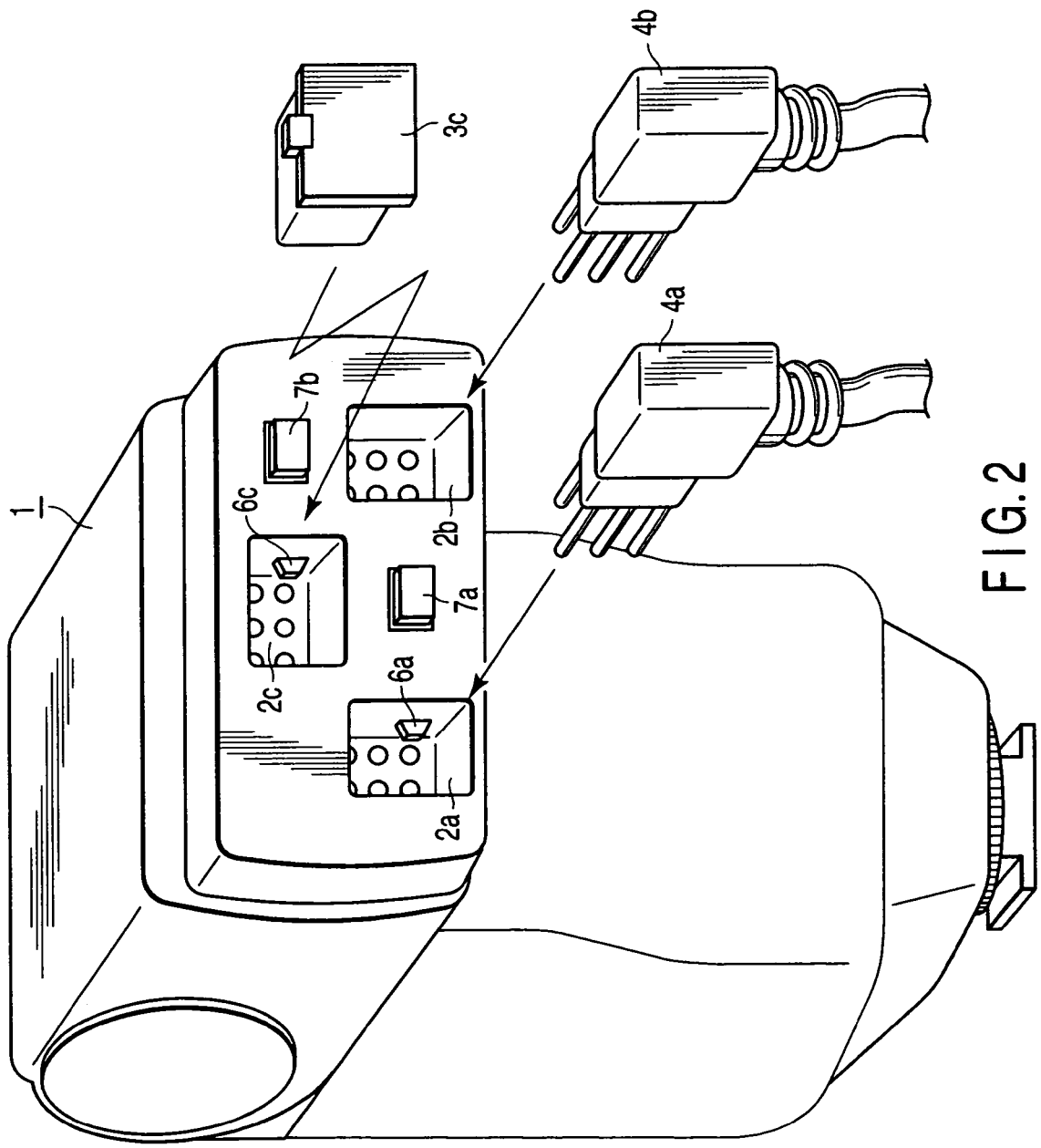
FIG. 2 is an enlarged view around a control unit.

FIG. 2 is an enlarged view around the control unit 1. Here, FIG. 2 is a diagram showing that the light emitting units 4a, 4b are attached to the control unit 1. In this case, the connection portion 2c of the control unit 1 is in an unused state. The cap 3c is attached to the connection portion 2c to shield the connection portion 2c. It is to be noted that when the light emitting unit or the cap is attached to each connection portion, the light emitting unit or the cap is locked and is prevented from being detached. This locking mechanism is not an essential mechanism of the present invention, and therefore description thereof is omitted. When detachment members 7a and 7b are pressed, the light emitting unit or the cap attached to each connection portion is unlocked, and the light emitting unit or the cap can be detached from the connection portion.

When the unused connection portion is shielded in this manner, a high-voltage terminal is not exposed. However, a user sometimes forgets to attach the cap. In this case, the connection portion is exposed.

To solve the problem, in the present embodiment, each connection portion is provided with a detection member which is a first judgment section for detecting whether or not the connection portion has been shielded. That is, when either the light emitting unit or the cap is attached to each connection portion, the detection member is pressed. It is to be noted that FIG. 2 shows only two detection members (detection members 6a, 6c) but, needless to say, the connection portion 2b is also actually provided with the detection member.

Figure 3:
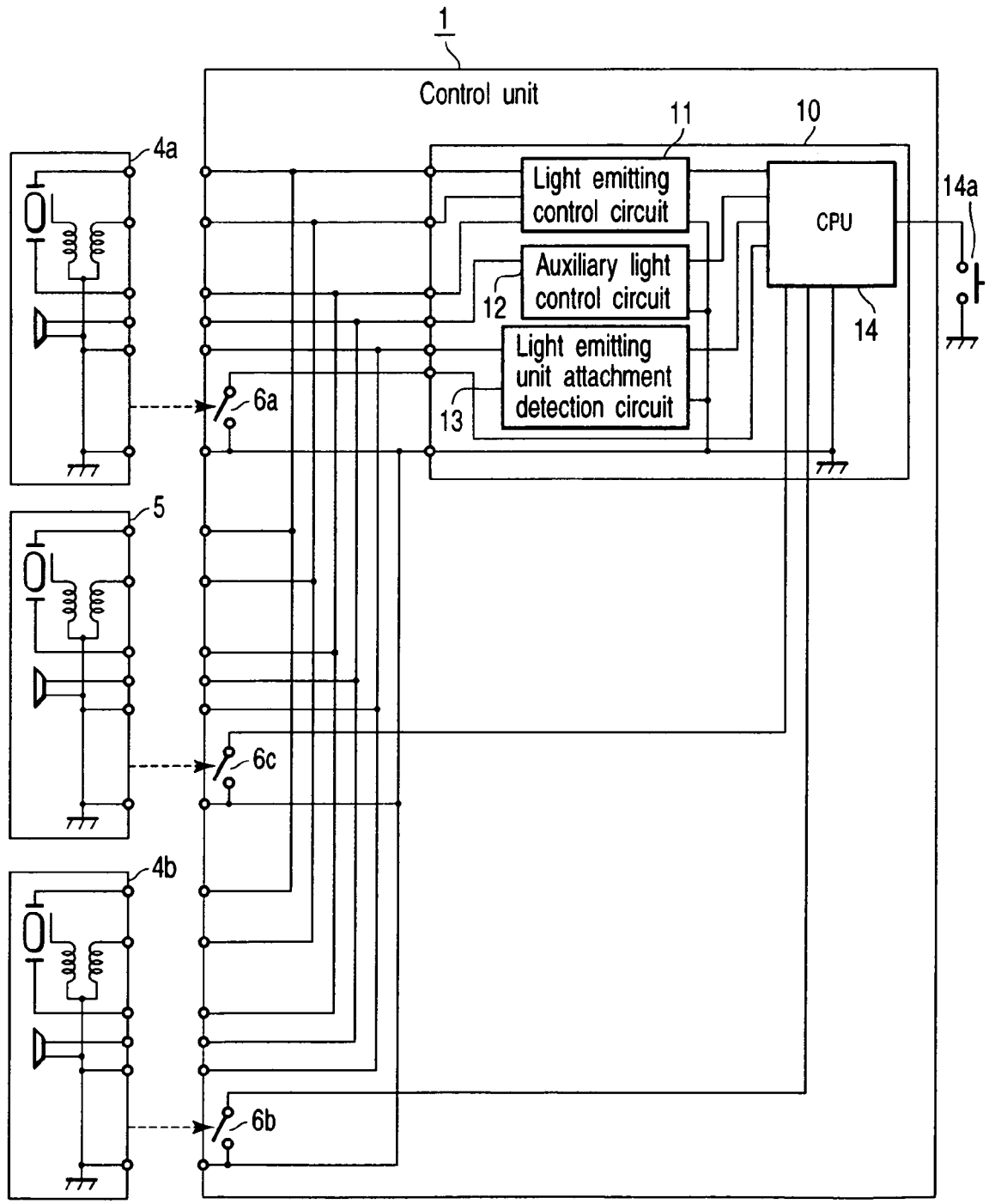
FIG. 3 is a block circuit diagram showing a constitution inside the control unit.

FIG. 3 is a block circuit diagram showing a constitution inside the control unit 1. That is, as shown in FIG. 3, a controller section 10 which controls the flash device is disposed inside the control unit 1. This controller section 10 is provided with: a light emitting control circuit 11 which controls flash light emission in each light emitting unit; an auxiliary light control circuit 12 which controls auxiliary light emission in each light emitting unit; a light emitting unit attachment detection circuit 13 which is a second judgment section for detecting that the light emitting unit has been attached to each connection portion; and a CPU 14 which is a control circuit to control each circuit or the like. The CPU 14 is provided with a power switch 14a which turns on/off by user's operation. The CPU 14 judges an operation state of the power switch 14a to thereby bring the flash device into an operative or inoperative state. Here, the operative state of the flash device is a state in which it is possible to execute a light emitting operation of the flash device. On the other hand, the inoperative state refers to a state in which the CPU 14 only monitors the state or the like of the power switch 14a, and another operation is not performed.

Moreover, in FIG. 3, one end of each of detection switches 6a to 6c which open/close depending on whether or not the detection members have been pressed is connected to the CPU 14, and the other end thereof is grounded. By this constitution, it can be detected that the connection portion has been shielded.

For example, when the connection portion 2a is shielded by the cap 3a or the light emitting unit 4a, the detection member 6a is accordingly pressed and, as a result, the detection switch 6a of FIG. 3 closes. Accordingly, since the CPU 14 is grounded, and a potential level drops, the CPU 14 can judge that the connection portion 2a has been shielded. This operation also applies to the connection portions 2b and 2c.

Moreover, in FIG. 3, the light emitting unit attachment detection circuit 13 is constituted in such a manner that the circuit is grounded only in a case where the light emitting unit is attached to any connection portion. That is, when the light emitting unit is attached to the connection portion, the light emitting unit attachment detection circuit 13 is grounded, the potential level drops, and therefore it can be detected that the light emitting unit has been attached to the connection portion. It is to be noted that a detection result in the light emitting unit attachment detection circuit 13 is output to the CPU 14.

That is, the CPU 14 controls the light emitting control circuit 11 based on opened/closed states of the detection switches 6a to 6c, and an output from the light emitting unit attachment detection circuit 13.

This control of the light emitting control circuit 11 will be described with reference to FIG. 4 in more detail. That is, in FIG. 4, the light emitting control circuit 11 comprises a charging circuit 11a, a flash capacitor 11b, a discharging circuit 11c, and a light emitting circuit 11d.

When charging of the flash capacitor 11b is instructed by the CPU 14, a voltage of a power supply 15 is raised to a flash light emitting voltage (300V), and thereafter the charging circuit 11a charges the flash capacitor 11b. Thereafter, when an instruction to start flash light emission is received from the camera 100, the CPU 14 supplies a charge stored in the flash capacitor 11b to a flash light emitting tube (Xe tube) 42 via the light emitting circuit 11d. Furthermore, the CPU 14 generates a high voltage in a trigger transformer 41 via the light emitting circuit 11d, and the Xe tube 42 is allowed to emit the light by this voltage.

Moreover, when the discharging of the flash capacitor 11b is instructed by the CPU 14, the discharging circuit 11c discharges electric power from the flash capacitor 11b. Here, the discharging circuit 11c comprises a resistance element, a switch and the like for the discharging. That is, when the instruction of the CPU 14 is received, the switch closes. Accordingly, the electric charges of the flash capacitor 11b is discharged via the resistance element.

Figure 4:
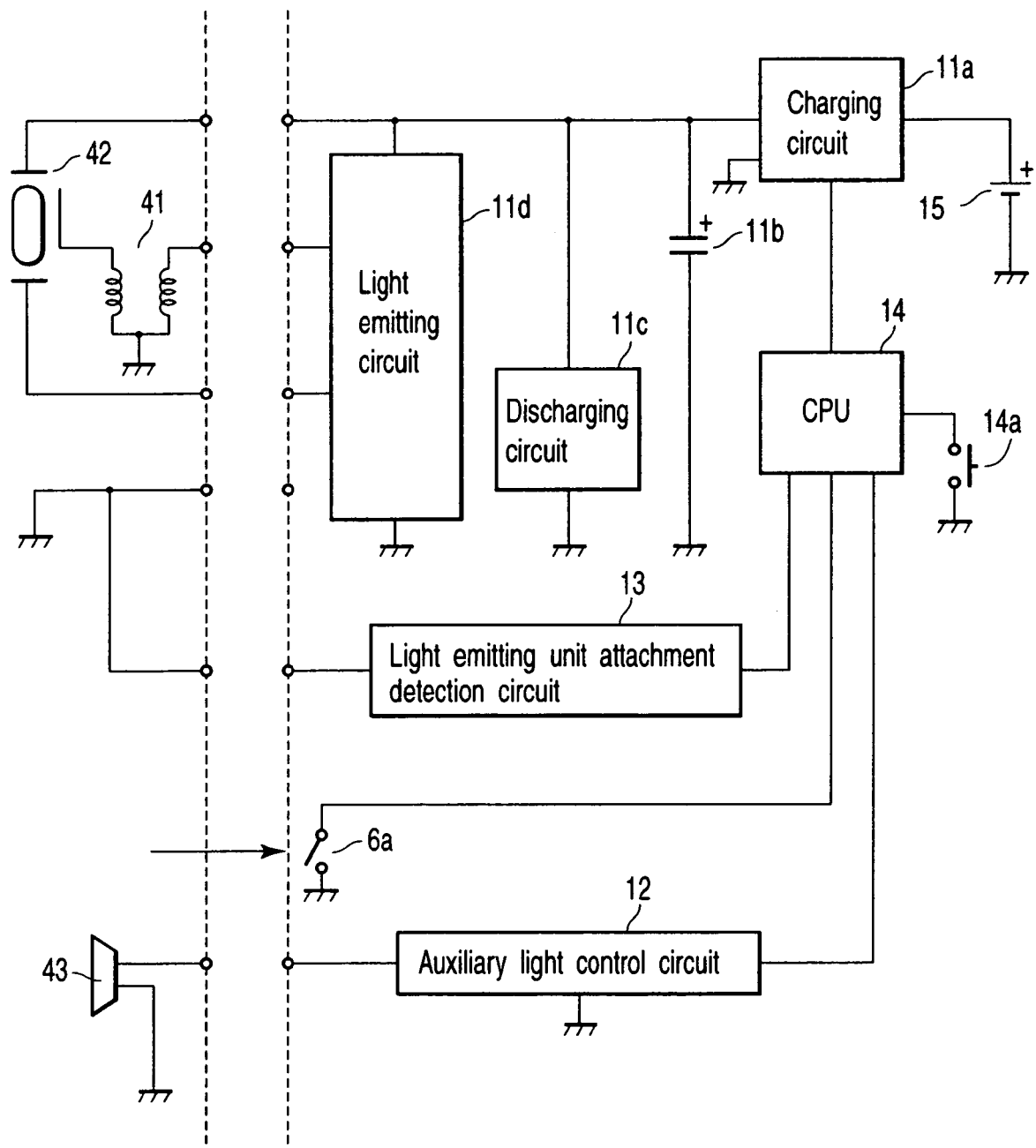
FIG. 4 is a block circuit diagram showing a constitution of a controller section in detail.

Moreover, in FIG. 4, the CPU 14 controls the auxiliary light control circuit 12 in such a manner that an auxiliary light emitting unit 43 is allowed to emit the light.

Next, a control operation of the controller section 10 in accordance with the state of each connection portion will be described with reference to FIGS. 5A to 5C.

FIG. 5A is a diagram showing the control operation of the controller section 10 in accordance with the state of each connection portion at a time when the flash device is in an inoperative state (power supply off state), and further the flash capacitor 11b is in an uncharged state.

First, when any light emitting unit is not attached to any connection portion, or any cap is not attached, the controller section 10 maintains the inoperative state of the flash device, and does not charge the flash capacitor 11b. Furthermore, in this case, for example, even when a user turns on the power switch 14a, the inoperative state of the flash device is maintained.

Moreover, even when any light emitting unit is not attached to any connection portion, and the caps are attached to all the connection portions, the controller section 10 maintains the inoperative state of the flash device. This is a state in which any light emitting unit is not attached to any connection portion, and the flash device does not have to be operated.

Furthermore, the controller section 10 maintains the inoperative state of the flash device even in a case where the light emitting unit is attached to at least one connection portion, and any cap is not attached to the connection portion to which any light emitting unit is not attached. This is a state in which at least one connection portion is opened, and it is not preferable to charge the flash capacitor 11b in this state.

On the other hand, the light emitting unit is attached to at least one connection portion, and the cap is attached to the connection portion to which any light emitting unit is not attached. In this case, the controller section 10 brings the flash device into an operative state (turns on the power supply) in response to an on-operation of the power switch 14a by the user. The controller section 10 also starts the charging of the flash capacitor 11b.

FIG. 5B is a diagram showing a control operation of the controller section 10 in accordance with the state of each connection portion at a time when the flash device is in the operative state.

First, in a case where even one light emitting unit attached to the connection portion is detached, the controller section 10 discharges the electric charges accumulated in the flash capacitor 11b, and thereafter brings the flash device into the inoperative state. This prevents a high voltage from being generated in a terminal of the connection portion opened by the detaching of the light emitting unit.

Moreover, even in a case where the light emitting unit is attached, but the caps of the remaining connection portions are removed, the controller section 10 discharges the electric charges accumulated in the flash capacitor 11b, and thereafter brings the flash device into the inoperative state. This prevents a high voltage from being generated in the terminal of the connection portion opened by the detaching of the caps.

On the other hand, when the light emitting unit is attached to at least one connection portion, and the caps are attached to the remaining connection portions, the flash device is brought into the inoperative state in response to the user's off-operation of the power switch 14a. In this case, the flash device may be brought into the inoperative state after discharging the electric charges accumulated in the flash capacitor 11b, or the flash device may be brought into the inoperative state without discharging the electric charges accumulated in the flash capacitor 11b. It is to be noted that when the power switch 14a is not turned off, needless to say, the operative state of the flash device is maintained.

Here, a case where both the light emitting unit and the cap are removed from the connection portion is omitted from FIG. 5B. When one of the light emitting unit and the cap is removed from the connection portion, the discharging operation of the flash capacitor 11b is performed, and the flash device is brought into the inoperative state.

FIG. 5C is a diagram showing the control operation of the controller section 10 in accordance with the state of each connection portion at a time when the flash device is in the inoperative state and further the flash capacitor 11b is in the charged state. This corresponds to the case where the flash device is brought into the inoperative state without discharging the electric charges accumulated in the flash capacitor 11b in FIG. 5B.

First, when even one light emitting unit attached to the connection portion is detached, the controller section 10 discharges the electric charges accumulated in the flash capacitor 11b, and thereafter maintains the inoperative state of the flash device. This prevents the high voltage from being generated in the terminal of the connection portion opened by the removing of the light emitting unit.

Moreover, even when the light emitting unit is attached, and the caps of the remaining connection portions are removed, the controller section 10 discharges the electric charges accumulated in the flash capacitor 11b, and thereafter maintains the inoperative state of the flash device. This prevents the high voltage from being generated in the terminal of the connection portion opened by the removing of the caps.

On the other hand, when the light emitting unit is attached to at least one connection portion, and the caps are also attached to the remaining connection portions, the controller section 10 brings the flash device into the operative state in accordance with the user's on-operation of the power switch 14a.

Here, the case where both the light emitting unit and the cap are removed from the connection portion is omitted from FIG. 5C. This is because FIG. 5C is shifted from FIG. 5B. It is to be noted that to bring the flash device into the inoperative state, after the discharging the electric charges accumulated in the flash capacitor 11b, the flash device may be brought into the inoperative state. In this case, in the next power supply control operation, the operation of FIG. 5A may be performed.

According to the above-described embodiment, since the charging of the flash capacitor is prohibited in a case where the connection portion is opened, the high voltage can be prevented from being generated in the terminal of the connection portion in a state in which the connection portion is exposed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A flash device comprising:
   at least one light emitting unit;
   a plurality of connection portions constituted so that at least one light emitting unit is attachable thereto;
   a plurality of shielding portions to shield the connection portion to each of which the light emitting unit is not attached;
   a capacitor which accumulates electric charges to allow the light emitting unit to emit light;
   a charging circuit which charges the capacitor; and
   a control circuit including a first judgment section to judge whether or not all the plurality of connection portions are shielded and a second judgment section to judge whether or not the light emitting unit is attached to at least one of the plurality of connection portions, the control circuit permitting electric charges accumulation operation into the capacitor by the charging circuit in a case where the first judgment section judges that all the connection portions are shielded and the second judgment section judges that the light emitting unit is attached to at least one of the plurality of connection portions.

2. The flash device according to claim 1, further comprising: a discharging circuit which discharges the electric charges accumulated in the capacitor,
   wherein the control circuit allows the discharging circuit to discharge the electric charges accumulated in the capacitor in a case where the first judgment section judges that at least one of the plurality of connection portions is not shielded.

3. The flash device according to claim 2, wherein the control circuit prohibits the electric charges accumulation operation into the capacitor by the charging circuit in a case where the first judgment section judges that at least one of the plurality of connection portions is not shielded in a state in which the electric charges accumulation operation into the capacitor by the charging circuit is permitted.

4. A flash device comprising:
a plurality of light emitting means for emitting light;
a plurality of connection means for being attached the plurality of light emitting means;
a plurality of shielding means for shielding the connection means to which any light emitting means is not attached;
an electric charges accumulation means for accumulating an electric charges to allow the light emitting means to emit the light;
a charging means for charging the electric charges accumulation means;
a first judgment means for judging whether or not all the plurality of connection means are shielded by the plurality of shielding means;
a second judgment means for judging whether or not the light emitting means is attached to at least one of the plurality of connection means; and
a control means for controlling a charging operation by the charging means and an operative state of the flash device based on judgment results of the first and second judgment means.

5. The flash device according to claim 4, wherein the first judgment means judges whether or not the light emitting means or the shielding means is attached to all the plurality of connection means.

6. The flash device according to claim 4, wherein the control means allows an electric charges accumulation operation into the electric charges accumulation means by the charging means in a case where the first judgment means judges that all the connection means are shielded by the plurality of shielding means and the second judgment means judges that the light emitting means is attached to at least one of the plurality of connection means.

7. The flash device according to claim 4, further comprising: discharging means for discharging the electric charges accumulated in the electric charges accumulation means,
wherein the control means allows the discharging means to discharge the electric charges accumulated in the electric charges accumulation means in a case where the first judgment means judges that at least one of the plurality of connection means is not shielded.

8. The flash device according to claim 4, wherein the control means brings the flash device into an inoperative state in a case where the first judgment means judges that at least one of the plurality of connection means is not shielded.

9. A flash device having a plurality of connection portions to which one or more of a plurality of flash light emitting units are to be independently attached, the flash device prohibiting a charging operation to operate the flash light emitting unit in a case where even one of the plurality of connection portions is neither connected to a flash light emitting unit, nor covered with a cap.

10. A flash device comprising:
a plurality of light emitting units;
a plurality of connection portions constituted so that the plurality of light emitting units are attachable thereto;
a plurality of caps to shield connection portions to which the light emitting units are not attached;
a capacitor which accumulates an electric charge to allow the light emitting unit to emit light;
a charging circuit which charges the capacitor;
a plurality of detection members which are disposed in the plurality of connection portions and which are displaced in cooperation with attachment of the light emitting unit or the cap;
a plurality of detection switches which are disposed in the plurality of detection members and whose states change in accordance with the displacements of the detection members;
detection terminals which are disposed in the plurality of connection portions and whose potential levels change in accordance with attached states of the light emitting units; and
a control circuit which controls the charging by the charging circuit and an operative state of the flash device based on the states of the detection switches and the potential levels of the detection terminals.

11. The flash device according to claim 10, wherein the detection terminal is connected to a ground line in a case where each of the plurality of light emitting units is attached to one of the plurality of connection portions.

12. A flash device comprising:
a plurality of flash light emitting units;
a plurality of connection portions constituted so that one or more of the plurality of flash light emitting units are independently attachable thereto;
a capacitor which accumulates an electric charge to allow any of the one or more flash light emitting units to emit light;
a charging circuit which charges the capacitor; and
a control circuit which controls the charging circuit in such a manner as to prohibit the charging of the capacitor in a case where at least one of the plurality of connection portions is neither connected to a flash light emitting unit, nor covered with a cap.

13. The flash device according to claim 12, further comprising: a discharging circuit which discharges the electric charges of the capacitor in a case where one of the plurality of connection portions is opened in a state in which the electric charges is accumulated in the capacitor.

14. The flash device according to claim 9, wherein the at least one of the plurality of flash light emitting units is a xenon tube.

15. The flash device according to 12, wherein the at least one of the plurality of flash light emitting units is a xenon tube.

* * * * *